United States Patent Office 2,763,652
Patented Sept. 18, 1956

2,763,652
PIPERAZINEDIONES AND METHODS FOR THEIR PREPARATION

Sidney R. Safir, River Edge, N. J., Joseph J. Hlavka, Nanuet, N. Y., and James H. Williams, Ridgewood, N. J., assignors to American Cyanamid Company, New York, N. Y., a corporation of Maine No Drawing. Application February 1, 1954, Serial No. 407,602

12 Claims. (Cl. 260—268)

This invention relates to a series of new organic compounds. More particularly, it relates to $N^4$-substituted-3-phenyl-2,6-piperazinediones, derivatives thereof and their methods of manufacture.

The compounds of this invention may be represented by the following general formula:

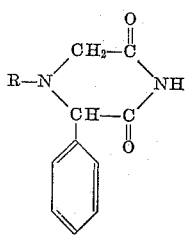

wherein R is a member selected from the group consisting of aralkyloxycarbonyl, alkoxycarbonyl, haloalkanoyl, aralkanoyl and alkenyloxycarbonyl radicals. As examples of these may be given the following: carbobenzoxy, carbethoxy, β-chloropropionyl, β-phenylpropionyl and carboallyloxy.

One of the objects of the present invention is to provide novel derivatives of 3-phenyl-2,6-piperazinedione and methods for their preparation, which compounds are useful as intermediates in the field of organic chemistry and as therapeutic agents in the field of medicine. More particularly, the $N^4$-substituted-3-phenyl-2,6-piperazinediones of this invention (of which 3-phenyl-4-carbobenzoxy-piperazinedione may be given as a specific example) are useful anaesthetic agents for parenteral administration.

In accordance with the present invention, the desired $N^4$-substituted-3-phenyl-2,6-piperazinediones are prepared from the isomeric monoamides of α-(N-carbobenzoxy-N-carboxymethylamino)-toluic acid, which are initially obtained from α-(N-carbobenzoxy-N-carboxymethylamino)-α-toluic acid by a series of chemical transformations. These compounds and the methods for their manufacture constitute the subject matter of U. S. application, S. N. 407,601, filed concurrently herewith by Safir et al. The 2,6-piperazinedione is formed by subjecting the monoamide to the proper dehydrating conditions such as heating to effect ring-closure by the elimination of the elements of water. The reaction may be exemplified as follows:

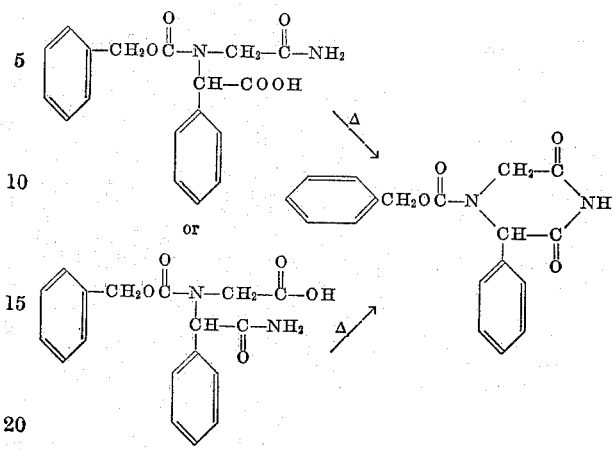

Temperatures ranging from 100–225° C. may be suitably employed for this dehydration, the preferred range being between 165–175° C.

The resulting 4 - carbobenzoxy - 3 - phenyl - 2,6 - piperazinedione is an effective anaesthetic agent. Other groups however such as the carbethoxy, chloropropionyl, phenylpropionyl, etc. may be readily substituted in the $N^4$ position in place of the carbobenzoxy function resulting in equally useful anaesthetic agents suitable for parenteral administration. One method of removing the carbobenzoxy group is by catalytic hydrogenolysis with a palladium catalyst. The 3-phenyl-2,6-piperazinedione can then readily accept various substituents in the $N^4$ position.

The addition of substituents into the $N^4$ position of the piperazinedione ring following removal of the blocking group may be effected by various methods. Using the acylation technique for example, the piperazinedione dissolved in a suitable solvent such as acetone or dry benzene, may be reacted with the corresponding acide chloride to obtain the substitution of such groups as the acetyl, dichloroacetyl, chloropropionyl, β-phenylpropionyl, etc. As further examples of substituents may be given the carboxyacrylyl and the carboxypropionyl radicals which may be placed in the $N^4$ position by reacting the piperazinedione directly with maleic or succinic anhydrides respectively under such conditions of temperature and time as are more particularly set forth in the examples below. Other methods of placing substituents in the $N^4$ position, may be employed by various techniques known to those skilled in the art.

In more specific detail, the following examples are intended to illustrate the scope of this invention.

Example I

Seventy-eight grams of the monoamide of α-(N-carbobenzoxy-N-carboxymethylamino)-α-toluic acid was heated to 165–175° C. and held at this temperature for 1¾ hours. The reaction mixture was cooled, and the resulting amorphous solid was crystallized from methanol, yielding 39 grams of 4-carbobenzoxy-3-phenyl-2,6-piperazinedione, melting at 128–131° C.

Example II

Ten grams of 4-carbobenzoxy-3-phenyl-2,6-piperazinedione was suspended in 500 ml. of ethanol with 5 grams of 10% palladium on charcoal. This closed system was flushed with nitrogen for 15 minutes, after which time hydrogen was bubbled through the solution until the effluent gases showed only a trace of carbon dioxide when passed through a barium hydroxide solution. The system was again flushed with nitrogen, and the reaction mixture was then filtered. The filtrate was evaporated under vacuum to about ⅕ volume, and the resulting precipitate was filtered off and dried. This product, 3-phenyl-2,6-piperazinedione, totaling 3.8 grams was recrystallized from ethanol and had a melting point of 125–127° C.

Example III

Two grams of 4-carbobenzoxy-3-phenyl-2,6-piperazinedione was dissolved in 40 ml. of dry acetone, and 1.4 grams of 85% potassium hydroxide was added to the solution. The resulting solution was boiled under a reflux condenser and stirred while 0.6 ml. of methyl iodide in 10 ml. of dry acetone was added dropwise. After the addition was complete, the mixture was heated for another 10 minutes and then filtered. The filtrate was evaporated to dryness under vacuum, and water was added to the dry residue. The water-insoluble oil was extracted with ethyl acetate, and the extract was dried by treating with anhydrous magnesium sulfate. The dried filtrate was evaporated to dryness under vacuum yielding 1.5 grams of oily residue. This oil, 4-carbobenzoxy-1-methyl-3-phenyl-2,6-piperazinedione, was purified by evaporative distillation at 115–120° C./0.05 mm.

Example IV

One gram of 3-phenyl-2,6-piperazinedione was dissolved in 9 ml. of 98% formic acid, and 3.3 ml. of acetic anhydride was added. This mixture was heated to 60° C. for 5 minutes and then cooled. The resulting solution was evaporated to dryness under reduced pressure, and the solid, 4-formyl-3-phenyl-2,6-piperazinedione, was found to weigh 1 gram and to melt at 186–190° C. One half gram of this crude product was recrystallized from methanol, yielding 0.4 gram of purified product melting at 193–195° C.

Example V

One gram of 3-phenyl-2,6-piperazinedione was dissolved in 35 ml. of hot dry benzene, and 0.5 ml. of acetyl chloride was added to the solution. The precipitate which formed immediately was filtered off, and the filtrate was evaporated down to an amorphous oil which dried to a glass. Two ml. of water was added, and after about an hour the glass crystallized. The crystals were filtered off and air dried. This 4-acetyl-3-phenyl-2,6-piperazinedione was recrystallized from water, giving sparkling white crystals melting at 71–79° C. (turbid melt).

Example VI

One gram of 3-phenyl-2,6-piperazinedione was dissolved in 25 ml. of acetone, and 0.3 ml. of dichloroacetyl chloride was added. The mixture became warm, and the acetone started to boil. The mixture was allowed to cool to room temperature with occasional stirring. The precipitate was then filtered off and the filtrate was evaporated under vacuum to an oil which crystallized on standing at 20–25° C. for 10 hours. The crude product was recrystallized twice from methanol giving a purified 4-dichloroacetyl-3-phenyl-2,6-piperazinedione, melting at 168–170° C.

Example VII

A solid mixture of 1 gram of 3-phenyl-2,6-piperazinedione and 0.52 gram of maleic anhydride was heated to 110° C. for 30 minutes. The resulting solid was dissolved in hot ethanol, and the solution was filtered. The filtrate was cooled in an ice bath, causing the product to crystallize from solution. The yield was 1.2 grams of 4-($\beta$-carboxyacrylyl)-3-phenyl-2,6-piperazinedione melting at 169–177° C.

Example VIII

One gram of 3-phenyl-2,6-piperazinedione was suspended in 50 ml. of water, and 4.4 ml. of 1 N aqueous hydrochloric acid was added. Solution was effected by shaking. To this solution 3.6 grams of potassium cyanate in 5 ml. of water was added. After a few minutes a precipitate formed and was filtered off. The solid was recrystallized from aqueous acetic acid. The yield of 4-carbamyl-3-phenyl-2,6-piperazinedione was 0.5 gram melting at 235° C.

Example IX

A mixture of 1 gram of 3-phenyl-2,6-piperazinedione and 0.53 gram of succinic anhydride was heated to 110° C. for 30 minutes. The resulting solid was crystallized from n-propyl alcohol, yielding 0.3 gram of 4-($\beta$-carboxypropionyl)-3-phenyl-2,6-piperazinedione melting at 171–173° C.

Example X

To a solution of 2 grams of 3-phenyl-2,6-piperazinedione in 40 ml. of acetone at 25° C., 1.2 ml. of phenylisocyanate was added. After stirring and scratching the inner surface of the glass vessel, a solid 3-phenyl-4-(N-phenylcarbamyl)2,6-piperazinedione crystallized from solution, having a melting point of 219–220° C.

Example XI

This compound 3-phenyl-4-(N-m-tolylcarbamyl)-2,6-piperazinedione was prepared in the same manner as 3-phenyl-4-(N-phenylcarbamyl) - 2,6 - piperazinedione, the product of Example X. The compound melted at 210–212° C.

Example XII

Hydrogen at atmospheric pressure was bubbled through a mixture of 0.5 gram of platinum oxide catalyst suspended in a solution of 1.5 grams of 3-phenyl-4-(p-nitrobenzoyl)-2,6-piperazinedione, in 50 ml. of ethanol. The mixture was agitated during the hydrogen addition, which was continued until 310 cc. of hydrogen had been absorbed (15 cc. over the theoretical one molar amount). The catalyst was filtered, and the filtrate was concentrated under vacuum to a dry solid. This crude product was crystallized from ethanol to yield 0.8 gram of purified 3 - phenyl-4-(p-aminobenzoyl)-2,6-piperazinedione, melting at 182–183° C.

Example XIII

This compound 3-phenyl - 4 - (o - aminobenzoyl)-2,6-piperazinedione was prepared in the same way as the para-isomer (Example XII), from the o-nitrobenzoyl compound, the product of Example XXIII. The compound melted at 163–165° C.

Examples XIV–XXXII

All of the following compounds were prepared by reacting the appropriate acid chloride with the parent compound, 3-phenyl-2,6-piperazinedione as described in Example VI.

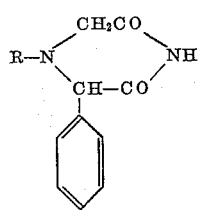

| Example Number | R | Melting Point, °C |
|---|---|---|
| XIV | —CO—CH₂—C₆H₅ | 120–121 |
| XV | —COCH₂Cl | 132–133 |
| XVI | —COCCl₃ | 168–170 |
| XVII | —COCH₂CH₂Cl | 138–140 |
| XVIII | CH₃—CO—O—C₆H₄—CO— | 152–154 |
| XIX | —CO—(2-Cl-C₆H₄) | 160–162 |
| XX | —C(O)—OCH₂CH₂Cl | |
| XXI | —COCH₂—O—C₆H₅ | 166–168 |
| XXII | —COCH₂CH₂—C₆H₅ | 102–104 |
| XXIII | —CO—(C₆H₄-NO₂) | 204–206 |
| XXIV | —CO—(2,6-Cl₂-C₆H₃) | 159–160 |
| XXV | —COCHCl—C₆H₅ | 141–143 |
| XXVI | —COCH=CH—C₆H₅ | 191–201 |
| XXVII | —CO—C₆H₄—NO₂ | 158–160 |
| XXVIII | —CO—CH(—O—)CH—CH (epoxide) | — |
| XXIX | —COOC₂H₅ | 105–107 |
| XXX | —COCH₂—C₆H₄—NO₂ | 140–142 |
| XXXI | —COOCH₂CH=CH₂ | 91–93 |
| XXXII | —SO₂—C₆H₄—CH₃ | 129–131 |

We claim:

1. Compounds of the group consisting of those having the general formula:

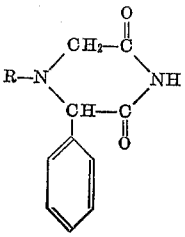

wherein R is a member selected from the group consisting of carbobenzoxy, lower alkoxycarbonyl, chlorolower alkanoyl, phenyl-lower alkanoyl and carboallyloxy radicals.

2. The compound 4 - carbobenzoxy - 3 - phenyl - 2,6-piperazinedione.

3. The compound 4 - carbethoxy - 3 - phenyl - 2,6-piperazinedione.

4. The compound 4-(β-chloropropionyl)-3-phenyl-2,6-piperazinedione.

5. The compound 4-(β-phenylpropionyl)-3-phenyl-2,6-piperazinedione.

6. The compound 4 - carboallyloxy - 3 - phenyl - 2,6-piperazinedione.

7. A method for preparing the compounds set forth in claim 1, which comprises heating the monoamide of α-(N-carbobenzoxy-N-carboxymethylamino)-α-toluic acid at a temperature of 165–175° C. for a period of 1 to 3 hours, subjecting the resultant 4-carbobenzoxy-3-phenyl-2,6-piperazinedione to treatment with hydrogen in the presence of palladium charcoal catalyst and then acylating the 3-phenyl-2,6-piperazinedione so obtained with a compound selected from the group consisting of lower alkoxycarbonyl chlorides, chloro-lower alkanoyl chlorides, phenyl-lower alkanoyl chlorides and carboallyloxy chlorides.

8. A method for preparing the compound 4-carbobenzoxy-3-phenyl-2,6-piperazinedione which comprises heating the monoamide of α-(N-carbobenzoxy-N-carboxymethylamine)-α-toluic acid at a temperature of 165–175° C. for a period of 1 to 3 hours, cooling and crystallizing the resultant mixture from methanol to obtain the desired compound.

9. A method for preparing the compound 4-carbethoxy-3-phenyl-2,6-piperazinedione, which comprises reacting 3-phenyl-2,6-piperazinedione with ethylchloroformate at room temperature.

10. A method for preparing the compound 4-β-chloropropionyl-3-phenyl-2,6-piperazinedione which comprises reacting 3-phenyl-2,6-piperazinedione with β-chloropropionyl chloride at room temperature.

11. A method for preparing the compound 4-(β-phenylpropionyl)-3-phenyl-2,6-piperazinedione which comprises reacting 3-phenyl-2,6-piperazinedione with β-phenylpropionyl chloride at room temperature.

12. A method for preparing the compound 4-carboallyloxy-3-phenyl-2,6-piperazinedione which comprises reacting 3-phenyl-2,6-piperazinedione with allylchloroformate at room temperature.

No references cited.